Figure 1:
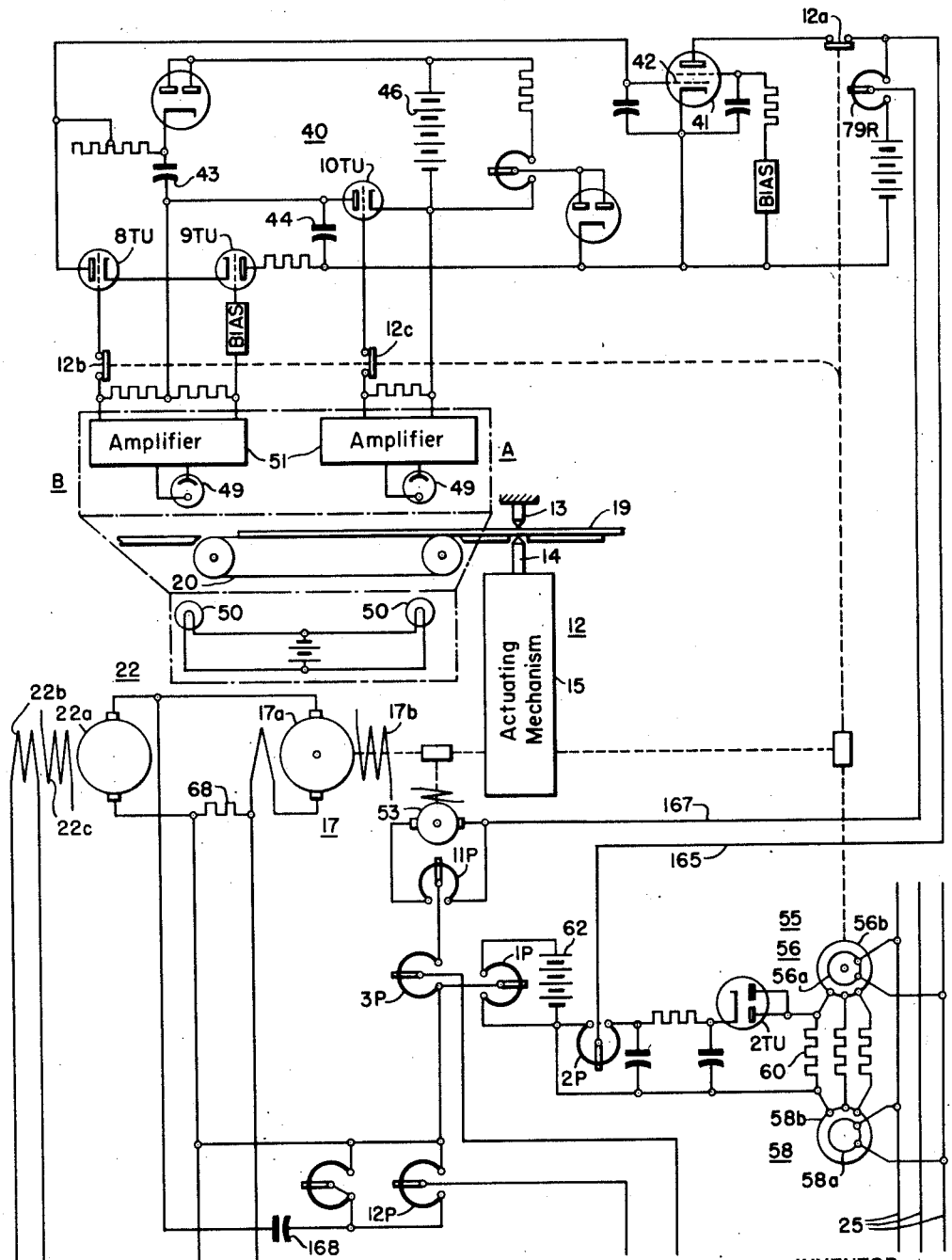

Oct. 20, 1953     F. VANDENBERG     2,655,994

CONTROL SYSTEM FOR CUTTING APPARATUS

Filed May 31, 1950     2 Sheets-Sheet 2

WITNESSES:
Edward Michaels
F. V. Giolma

INVENTOR
Frank Vandenberg.
BY
ATTORNEY

Patented Oct. 20, 1953

2,655,994

UNITED STATES PATENT OFFICE 2,655,994

CONTROL SYSTEM FOR CUTTING APPARATUS

Frank Vandenberg, East Aurora, N. Y., assignor to Westinghouse Electric Corporation, East Pittsburgh, Pa., a corporation of Pennsylvania Application May 31, 1950, Serial No. 165,207

9 Claims. (Cl. 164—49)

My invention relates generally to a control system for cutting apparatus, and it has reference, in particular, to a control system for a shear for cutting predetermined lengths from a moving strip of material.

Generally stated, it is an object of my invention to provide a control system for cutting apparatus which is simple and inexpensive to manufacture, and is reliable and accurate in operation.

More specifically, it is an object of my invention to provide, in a control system for a shear, for utilizing spaced impulses disposed in accordance with the speed of a strip of moving material for determining the starting time of a shear for cutting predetermined lengths from the strip.

Another object of my invention is to provide, in a shear control system, for utilizing a delayed impulse to initiate operation of a shear and for utilizing a fixed reference voltage in conjunction with a position-responsive synchrovoltage and a speed reference voltage for controlling the operation of the shear and returning it accurately to a rest position.

Yet another object of my invention is to provide, in a control system for a shear, for utilizing a timer voltage produced in accordance with the speed of a strip of material for accelerating a shear and subsequently removing the timer voltage and utilizing a synchronous control voltage responsive to the position of the shear and a fixed reference voltage for stopping the shear and maintaining it in a rest position.

It is also an object of my invention to provide, in a control system for a shear, for utilizing an electronic regulator, which is responsive to the algebraic sum of a timer voltage, a synchronous position-responsive voltage and opposed speed responsive and reference voltages, for accelerating and subsequently stopping a shear motor.

Other objects will in part be obvious, and will in part be explained hereinafter.

In practicing my invention according to one of its embodiments, timed impulses are produced as end of a strip of material, which is to be cut, passes spaced apart photoelectric devices adjustably disposed on the cut-off side of the shear. These impulses are applied to a timer which produces a starting impulse which is delayed in accordance with the speed of the strip, and is applied to a regulator for the driving motor of a shear in conjunction with a fixed reference voltage, a variable shear position-responsive voltage and a speed-responsive voltage. The regulator rapidly builds up the voltage applied to the shear motor until limit switches actuated by the shear interrupt the connection of the timer to the regulator after slightly more than one-half revolution of the shear and also disconnect the photoelectric devices from the timer. The regulator then operates under the influence of the position responsive voltage, the reference voltage, and the speed responsive voltage to reduce the voltage applied to the shear motor and bring it to an accurate stop. The limit switches reclose as the shear approaches its rest position so as to reset the control for the next cutting operation.

Figure 2:
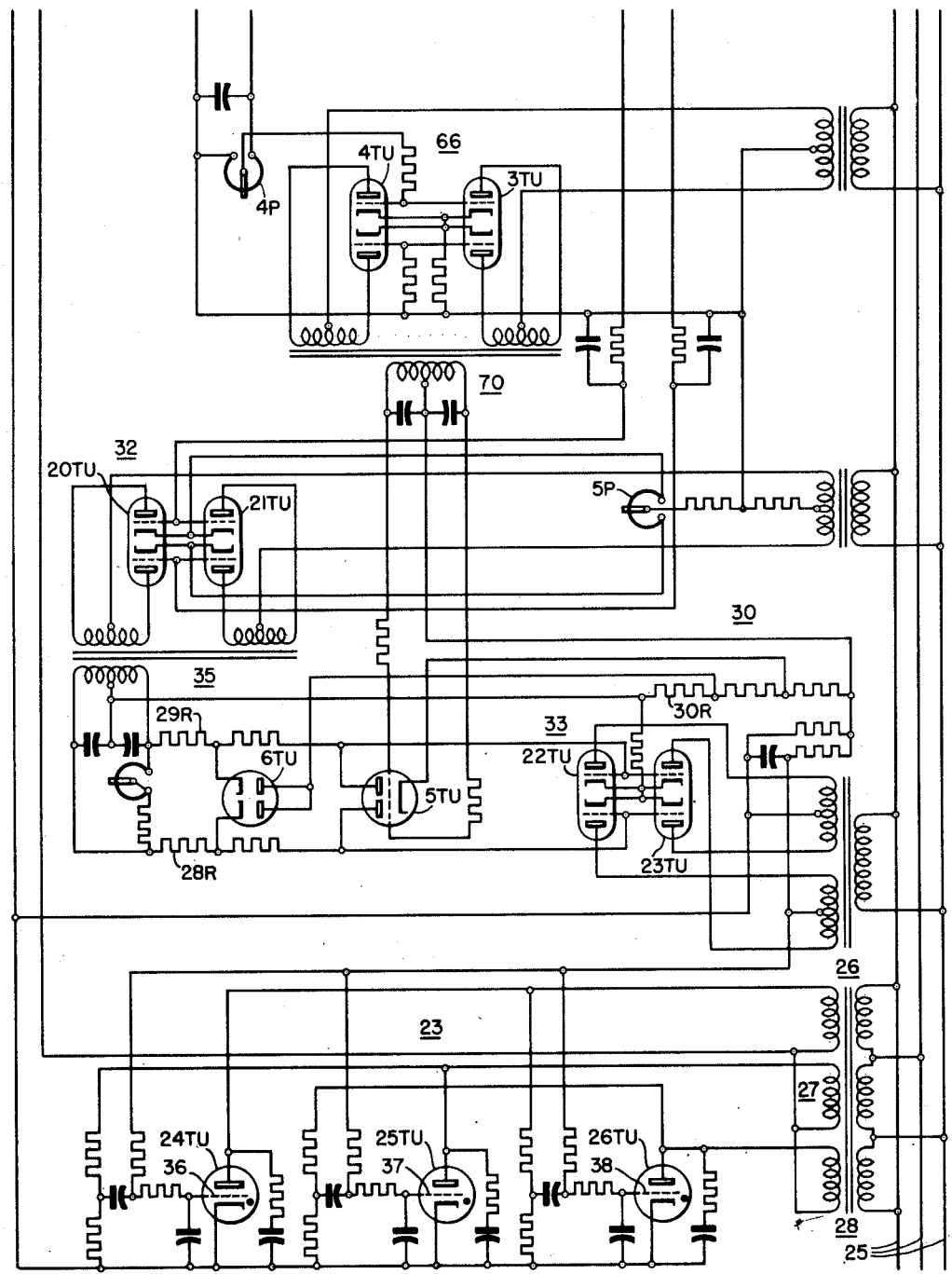
Figure 3:
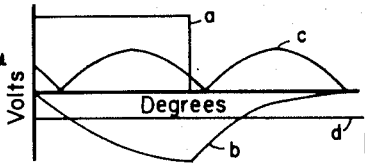

For a more complete understanding of the nature and scope of my invention, reference may be made to the following detailed description which may be read in connection with the accompanying drawings, in which:

Figures 1 and 2, positioned one above the other, represent diagrammatically a shear control system embodying the invention in one of its forms; and Fig. 3 illustrates curves representing the voltages applied to the regulator for controlling the shear through an operating cycle.

Referring to the system of Figs. 1 and 2, the reference numeral 12 may denote, generally, a shear of the up-cut type, comprising a stationary upper blade 13 and a movable lower blade 14 which may be actuated through a suitable mechanism 15 by means of a shear motor 17 for cutting a moving strip of material 19. A conveyor belt 20 may be provided for removing sheets cut from the strip 19, the speed of the conveyor belt being preferably about 20% greater than the speed of the strip 19 so as to ensure removing sheared sheets as expeditiously as possible.

The shear motor 17 may comprise an armature 17a and a field winding 17b. The field winding 17b may be supplied with electrical energy from a suitable source of substantially constant potential, while the armature 17a may be supplied with electrical energy from a main generator 22 comprising an armature 22a, a main field winding 22b and a bias field winding 22c.

The bias field winding 22c may be connected to any suitable source of electrical energy so as to provide an output voltage from the generator 22 in such a direction as to slowly reverse the shear motor 17 to return the shear to its normal rest position. The main field winding 22b may be supplied with electrical energy from a rectifier circuit 23 comprising a plurality of grid controlled rectifier devices 24TU, 25TU and 26TU, which may be connected to a polyphase source represented by conductors 25, through transformers 26, 27 and 28 in a manner well known in the art. The conductivity of the rectifier devices may be controlled by means of a regulator represented generally by the numeral 30, so as to normally balance the effect of the bias field winding 22c.

The regulator 30 may, for example, comprise amplifier stages 32 and 33 including valve devices 20TU and 21TU in the first stage, which may be coupled by means of a coupling transformer 35 to valve devices 22TU and 23TU in the second stage for controlling the voltage applied to the control electrodes 36, 37, and 38 of the rectifier devices 24TU, 25TU and 26TU, respectively.

A limiter valve device 6TU may be provided for producing a voltage drop in resistors 28R and 29R when the A.-C. signal voltage across the secondary of the coupling transformer 35 exceeds that across resistor 30R, so as to reduce the signal voltage applied to the second stage 33 of the amplifier. A balance potentiometer 5P may be provided on the input side of the amplifier stage 32 for adjusting the output voltage of the regulator. It may be adjusted to provide an output voltage under zero input conditions so that the main field winding 22b neutralizes the effects of the bias field winding 22c in the rest position.

In order to provide for starting the shear motor 17 in the proper timed relation to a predetermined control condition, such as movement of the strip 19, control means, such as the timer 40, may be provided for supplying a starting impulse for controlling the operation of the regulator 30. The timer 40 may, for example, comprise a circuit such as disclosed in the copending application Serial No. 165,210 of Edward C. Hartwig, having for example, a control valve 41 with its control electrode 42 disposed to be connected to capacitor discharge circuits including capacitors 43 and 44 having valve devices 8TU and 9TU associated therewith for controlling their respective discharge circuits. A valve device 10TU may be be provided for controlling the charging of the capacitors in opposite senses from a suitable source such as a battery 46. The valve device 8TU and the valve device 10TU may be normally conductive.

Control of the timer 40 may be effected by utilizing scanning devices A and B disposed to be positioned in predetermined spaced relation on the cut-off side of the shear 12 for determining the operation of the capacitor discharge circuits. The scanning devices may each comprise a photoelectric device 49 with an associated source of light 50 arranged so that the strip 19 intercepts the passage of light therebetween. An amplifier 51 in conjunction with the photoelectric device 49 may be disposed to apply a negative control impulse to the control electrode of the valve device 10TU when the leading end of the strip passes the photoelectric device 49 for rendering the valve device non-conductive. The amplifier 51 of scanning device B may likewise be disposed to apply negative and positive control impulses to the valve devices 8TU and 9TU, respectively, when the leading end of the strip 19 passes its associated photoelectric device.

When the voltages of the capacitors 43 and 44 are substantially equal, the bias on the control electrode 42 of the valve device 41 will be reduced to substantially zero, thus rendering the valve device conductive. This produces a voltage drop across the potentiometer device 79R in the plate circuit of the valve device and applies a positive timing impulse to the regulator 30 through conductors 165 and 167 for effecting operation of the generator 22 to accelerate the shear motor 17. Limit switches 12a, 12b and 12c operatively connected to the shear may be disposed to disconnect the timer from the regulator and the photoelectric amplifiers from the timer after about 200 degrees of shear rotation reclosing at about the 300 degree mark to reset the system.

In order to control the operation of the shear motor 17, a tachometer generator 53 may be provided for producing a voltage proportional to the speed of the shear motor. This voltage may be applied to the regulator 30 through a potentiometer 11P in opposed relation to the timer voltage so as to provide a speed limiting control.

With the purpose of locating the shear accurately in a normal position of rest, means such as the synchro system 55 may be provided. The synchro system 55 may comprise a synchro device 56 having its rotor 56a connected in driving relation with the shear 12 and connected for energization from a source of alternating-current represented by one pair of the conductors 25. A reference synchro device 58 may be utilized, having its rotor 58a also energized from the same pair of conductors 25.

The stators 56b and 58b of the two synchro devices may be connected together electrically with resistors 60 disposed in circuit relation therewith. A difference voltage derived from across one of the resistors 60 may be rectified by means of a valve device 2TU and applied to the regulator 30 through a potentiometer device 2P, cumulatively with respect to the timer voltage and in opposition to a fixed reference voltage which may be supplied from a source such as a battery 62, in conjunction with a potentiometer 1P. The positional, reference and speed responsive voltages may be applied to the regulator through a sensitivity potentiometer 3P.

In order to stabilize operation of the regulator 30, a voltage may be derived from across the armature 22a of the main generator and applied to the regulator through a capacitor 168 and an antihunt potentiometer 12P so as to produce an effect tending to oppose changes in the output voltage of the generator 22.

With a view to preventing too sudden acceleration or deceleration of the shear motor 17, current limit means 66 may be provided for modifying the operation of the regulator 30 in controlling the shear motor 17. A voltage may be derived from across a control resistor 68 connected in the armature circuit of the shear motor, and applied to valve devices 3TU and 4TU through a current limit potentiometer 4P. The valve devices 4TU and 3TU may be coupled to a rectifying valve 5TU by means of a coupling transformer 70 for modifying the grid voltages of the valve devices 22TU and 23TU of the regulator 30, so as to limit the acceleration and deceleration of the shear motor when the armature current thereof tends to exceed a predetermined safe value.

In operation, the passage of the leading edge of the strip 19 by the photoelectric devices of the scanners A and B produces impulses in spaced time relation in accordance with the speed of the strip. The first of these impulses stops the charging of the capacitors 43 and 44 and hence initiates the timing interval of the capacitor 43, the voltage of which thereupon proceeds to drop in accordance with the well-known exponential characteristic. The second impulse determines the timing period of the capacitor 44, the voltage of which thereupon proceeds to drop according to the exponential characteristic, while that of the capacitor 43 remains at a fixed value.

When the voltages of the two capacitors are substantially equal, the valve device 41 is rendered conductive and a timing impulse corresponding to the curve (a) of Fig. 3 is applied to the regulator 30 through conductors 165 and 167. This voltage is amplified in two stages by the amplifier tubes 20TU and 21TU, 22TU and 23TU, so that a positive grid voltage is applied to the control grids 36, 37 and 38 of the rectifier devices 24TU, 25TU and 26TU. Accordingly, the main field winding 22b of the main generator 22 will be energized at a maximum value as determined by the limiting action of the current limit circuit 66 and the shear motor 17 is rapidly accelerated to effect operation of the shear 12 to cut the strip 19.

As the shear motor 17 accelerates, the voltage of the tachometer generator 53 (curve b of Fig. 3) builds up proportionately, and the regulator 30 thereupon acts to hold the speed of the shear more or less constant. When the shear has rotated about 200°, the limit switches 12a, 12b and 12c open, disconnecting the timer 40 from the regulator and disconnecting the scanning devices A and B from the timer. With removal of the timing voltage, the regulator immediately acts to reduce the voltage of the main generator 22 and bring the shear motor 17 to zero speed under the influence of the differential between the reference and position responsive voltages. This action proceeds at a rate determined by the current limit means.

As the speed of the shear approaches zero, the operation of the synchro system 55 becomes more important. Since the voltage output of the synchro system varies with the position of the shear, as shown by the curve (c) of Fig. 3, it will be realized that the difference between the output voltage of the synchro system and the fixed reference voltage (curve d of Fig. 3) from the potentiometer IP will produce a reversible difference voltage which is reduced to a zero value only in the rest position of the shear. In the rest position the regulator is disposed to produce an output voltage of about 75 volts which is sufficient to neutralize the effects of the generator bias field winding.

Should the shear creep from this rest position, a positive voltage will be available for operating the regulator to increase its output voltage to operate the shear in a forward direction to return it to the rest position, or a negative blocking voltage will be applied to the rectifier devices 24TU, 25TU and 26TU while the bias field winding 22c will produce a reverse voltage to effect operation of the shear in the reverse direction to return it to the rest position. When the shear is substantially returned to the rest position, the limit switches 12a, 12b and 12c will be reclosed to reset the control system for a subsequent cutting operation.

The length of the sheet to be cut from the strip 19 may be determined by moving the scanning devices A and B as a unit longitudinally with reference to the shear 12. Since the speed of the conveyor belt 20 is greater than that of the strip 19, any tendency of the strip 19 to overlap a sheet which has been cut therefrom due to momentarily increased speed of the strip 19 resulting from the momentary pulse in the sheet 19 straightening out when the shear blades separate, may be compensated for by locating the scanning devices A and B at a sufficient distance from the shear. With a control of this type, it has been found that lengths of less than 5 feet and greater than 18 feet may be cut from strips having speeds varying from 30 to 215 feet per minute, with a high degree of accuracy.

From the above description and the accompanying drawings, it will be apparent that I have provided in a simple and inexpensive manner for controlling the operation of a simple type of up-cut shear so that it may be used to cut accurate lengths from a strip of moving material over a relatively wide range of strip speeds. The control system regulates the position of the shear, controls acceleration of the shear motor, regulates the top speed of the shear, controls the rate of slowdown, and also automatically adjusts the time of shearing to conform with changes in strip speed.

Since certain changes may be made in the above-described construction, and different embodiments of the invention may be made without departing from the spirit and scope thereof, it is intended that all the matter contained in the above description and shown in the accompanying drawings shall be considered as illustrative and not in a limiting sense.

I claim as my invention:

1. In combination with a motor connected in driving relation with a shear for cutting predetermined lengths from a moving strip of material, a pair of light sensitive devices disposed to be positioned at different distances from the shear and in predetermined longitudinally spaced relation with each other on the cut-off side of the shear for producing voltage impulses in timed relation with passage of the leading edge of the strip, circuit means operable to produce a control impulse in response to said voltage impulses after a time interval which varies with the interval between said voltage impulses, a regulator, a circuit connecting said circuit means to the regulator to effect energization of the motor to accelerate the shear in response to said control impulse, and switch means operatively connected to the shear disposed to disconnect the circuit means from the regulator.

2. The combination with a motor connected in driving relation with a shear for cutting a moving length of material, light sensitive means connected to produce impulses spaced in accordance with the speed of the material, a timer having a plurality of timing circuits disposed to be controlled by said impulses to produce an impulse signal in delayed relation with the passage of the material past the light sensitive means, said delayed relation being determined by the interval between the impulses, generating means connected to supply electrical energy to the motor including a regulator responsive to said impulse signal, tachometer means operable to provide a voltage proportional to the speed of the shear, position responsive means operable to produce a voltage variable in accordance with the position of the shear, and circuit means connecting the tachometer means and the position responsive means to the regulator with the timer and position responsive voltages opposing the voltage of the tachometer means, for controlling operation of the generating means.

3. In a control system for a motor connected in driving relation with cutting apparatus, a timer having a plurality of timing circuits connected to produce an initiating impulse, generator means connected to supply electrical energy to the motor including a regulator connected to be responsive to said impulse, position responsive means operable to produce a voltage variable with the position of the cutting apparatus, circuit means connected to apply the position voltage to the regulator cumulatively with respect to the impulse, and additional circuit means connected to apply a fixed reference voltage to the regulator in opposition to said impulse and position voltages, for controlling the output voltage of the generator means.

4. In a control system for a motor disposed to be connected in driving relation with cutting apparatus for cutting different predetermined lengths from a moving length of material, a timer having circuit means connected to produce a signal impulse in timed relation with the passage of the material past a pair of control stations, generating means connected to supply electrical energy to the motor including a regulator connected to respond to said signal impulse, position responsive means including a synchro device disposed to be connected to the cutting apparatus and a reference synchro device, said synchro devices being connected to produce a difference voltage which varies with the position of the cutting apparatus, and circuit means connected to apply the variable difference voltage to the regulator in opposition to a fixed reference voltage to effect operation of the generating means to return the cutting apparatus to a rest position determined by the balance point of the difference and reference voltages.

5. In a control system for a motor connected in driving relation with cutting apparatus, a timer having a plurality of timing circuits controlled in timed relation with movement of a material to be cut to provide a control impulse, a regulator responsive to said impulse to supply electrical energy to the motor, and control means responsive to the position of the cutting apparatus operable to apply a position responsive voltage to the regulator to operate the motor to return the cutting apparatus to its initial position.

6. The combination with a motor connected in driving relation with cutting apparatus having a normal rest position, of circuit means connected to provide a voltage impulse in delayed relation with the passage of a strip of material past a control point in accordance with the speed of the strip, a regulator connected to effect operation of the motor in accordance with the impulse from the circuit means, and control means responsive to the operating position of the motor operable to apply a position responsive signal to the regulator to effect operation of the motor to return to the rest position.

7. The combination with a motor connected in driving relation with cutting apparatus for cutting a moving length of material, of a circuit means connected to provide a voltage in timed relation with the speed of the material, a regulator disposed to effect energization of the motor to operate the cutting apparatus in response to said timer voltage, tachometer means operable to produce a voltage in opposition to the voltage of said circuit means and proportional to the speed of the cutting apparatus, and position responsive means connected in driving relation with the cutting apparatus to produce a voltage responsive to the position of the shear and in opposition to the tachometer voltage.

8. In a control system for a motor disposed to be connected in driving relation with cutting apparatus, circuit means connected to provide an initiating impulse delayed in a variable timed relation with the passage of a material to be cut past a reference point dependent on the rate of passage, generating means connected to supply electrical energy to the motor including an electronic regulator, a circuit connecting said circuit means to the regulator to control the generator in response to said initiating impulse, additional circuit means connected to the regulator to modify the operation in accordance with the speed and position of the motor, and switch means operable to disconnect the first-mentioned circuit means from the regulator when the motor reaches a predetermined operating position.

9. In a control system for a motor, a generator connected to supply electrical energy to the motor, said generator having a plurality of field windings, one of said field windings being connected to a source of electrical energy to effect energization of the motor in a reverse direction, a regulator connected to another of said field windings to effect energization thereof to effect operation of the motor in a forward direction, a timer having a plurality of timing circuits connected to provide an initiating voltage impulse for effecting operation of the regulator, a tachometer generator disposed to produce a voltage proportional to the speed of the motor, position responsive means disposed to produce a voltage variable with change in position of the motor, circuit means connecting the tachometer generator and the timer with their voltages in additive relation and in opposition to the position responsive voltage and a fixed source of reference voltage for controlling the regulator, and switch means operable in response to movement of the motor to disconnect the timer from the regulator after about one-half a revolution of the motor and reconnect it before one revolution is completed.

FRANK VANDENBERG.

References Cited in the file of this patent

UNITED STATES PATENTS

| Number | Name | Date |
|---|---|---|
| 1,991,083 | Dean | Feb. 12, 1935 |
| 2,195,006 | Gulliksen | Mar. 26, 1940 |
| 2,298,877 | Edwards et al. | Oct. 13, 1942 |
| 2,361,466 | Fitzsimmons | Oct. 31, 1944 |

FOREIGN PATENTS

| Number | Country | Date |
|---|---|---|
| 581,802 | Germany | Aug. 3, 1933 |